Figures 4, 5:
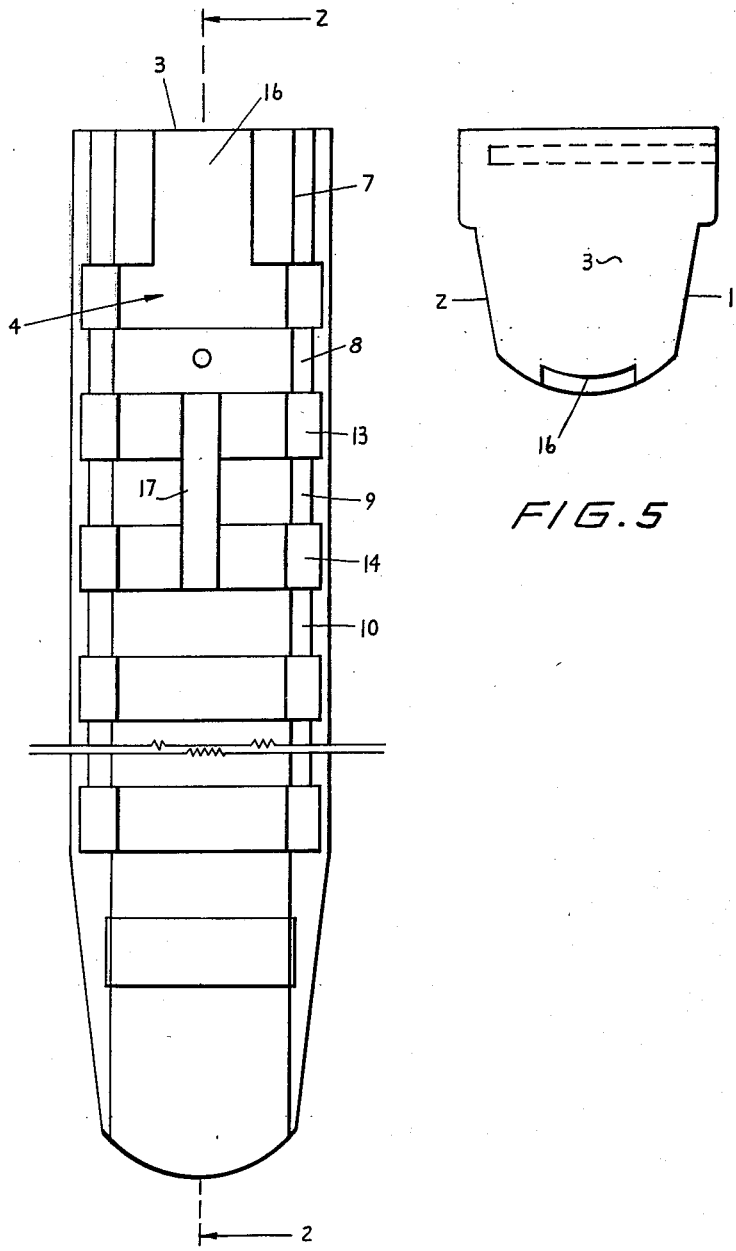

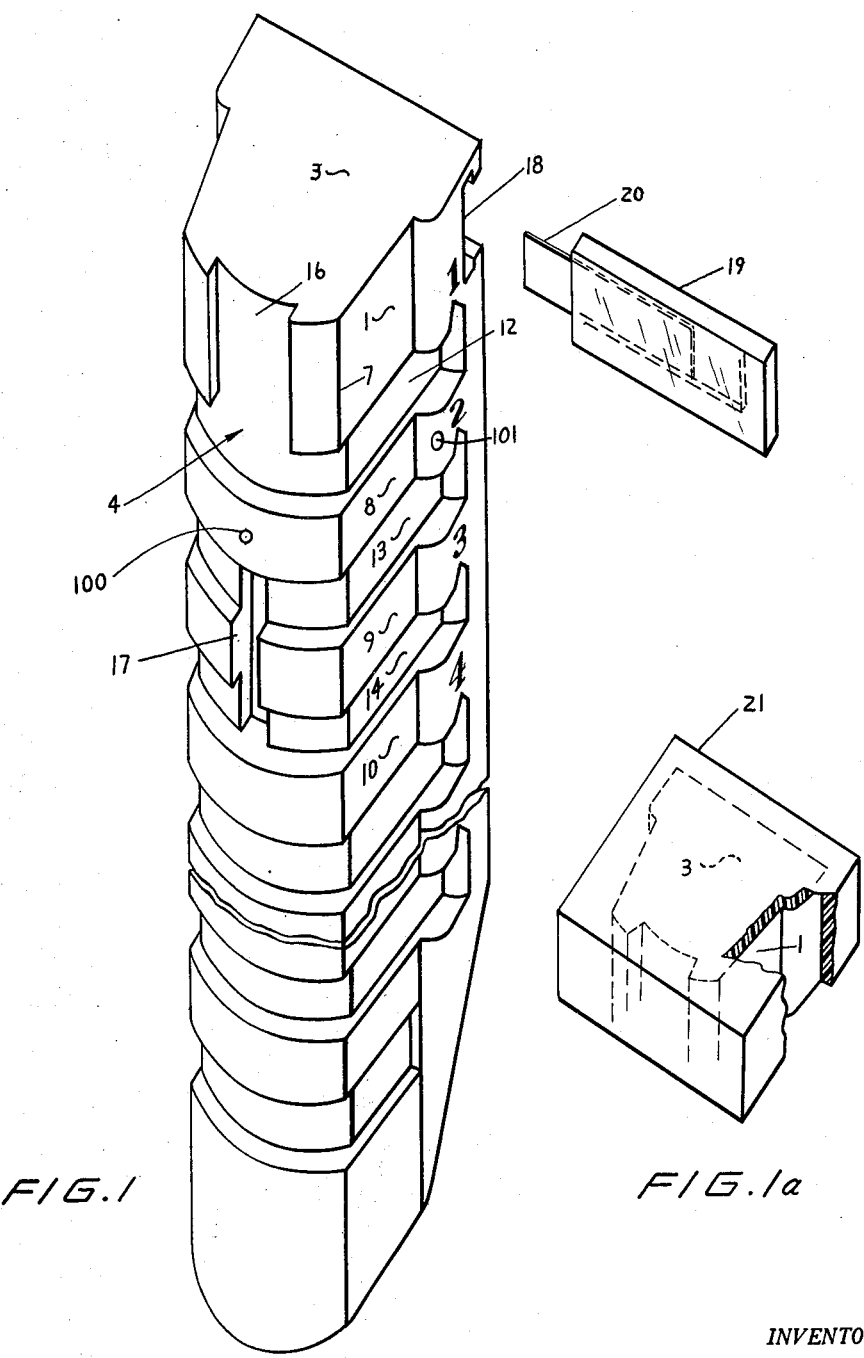

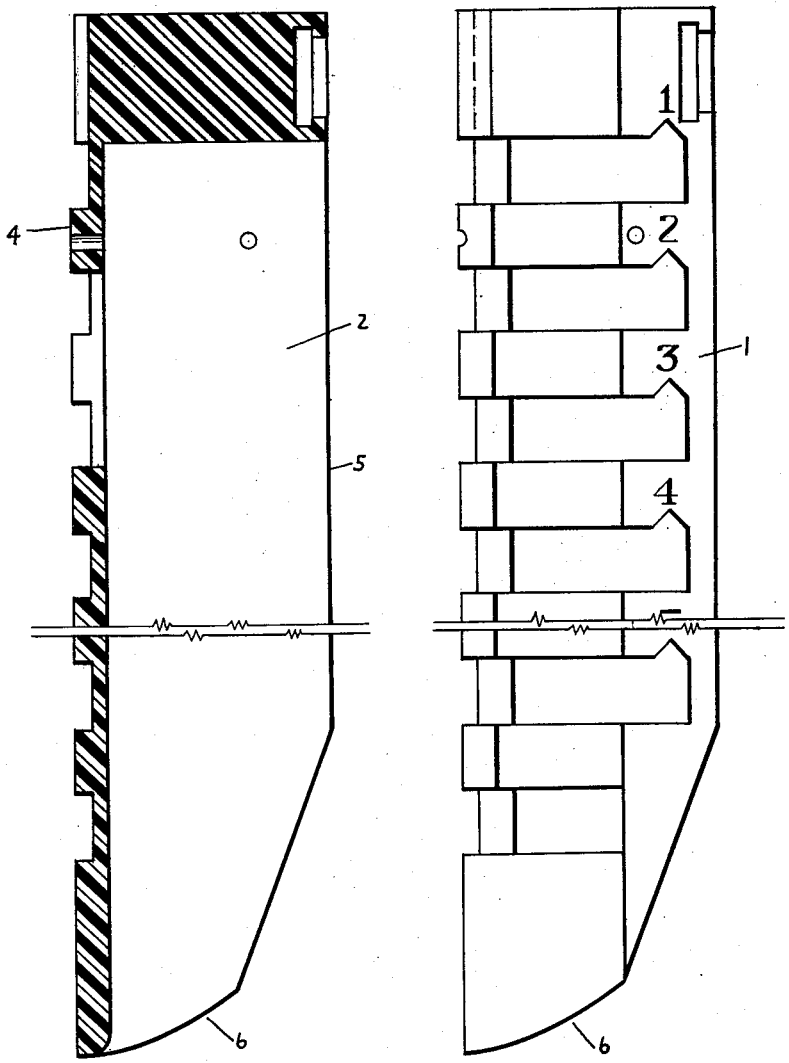

March 31, 1964   B. S. SHEINWALD   3,126,861
SURVEYING STAKE AND RELATED STRUCTURE
Filed March 24, 1961   6 Sheets-Sheet 4
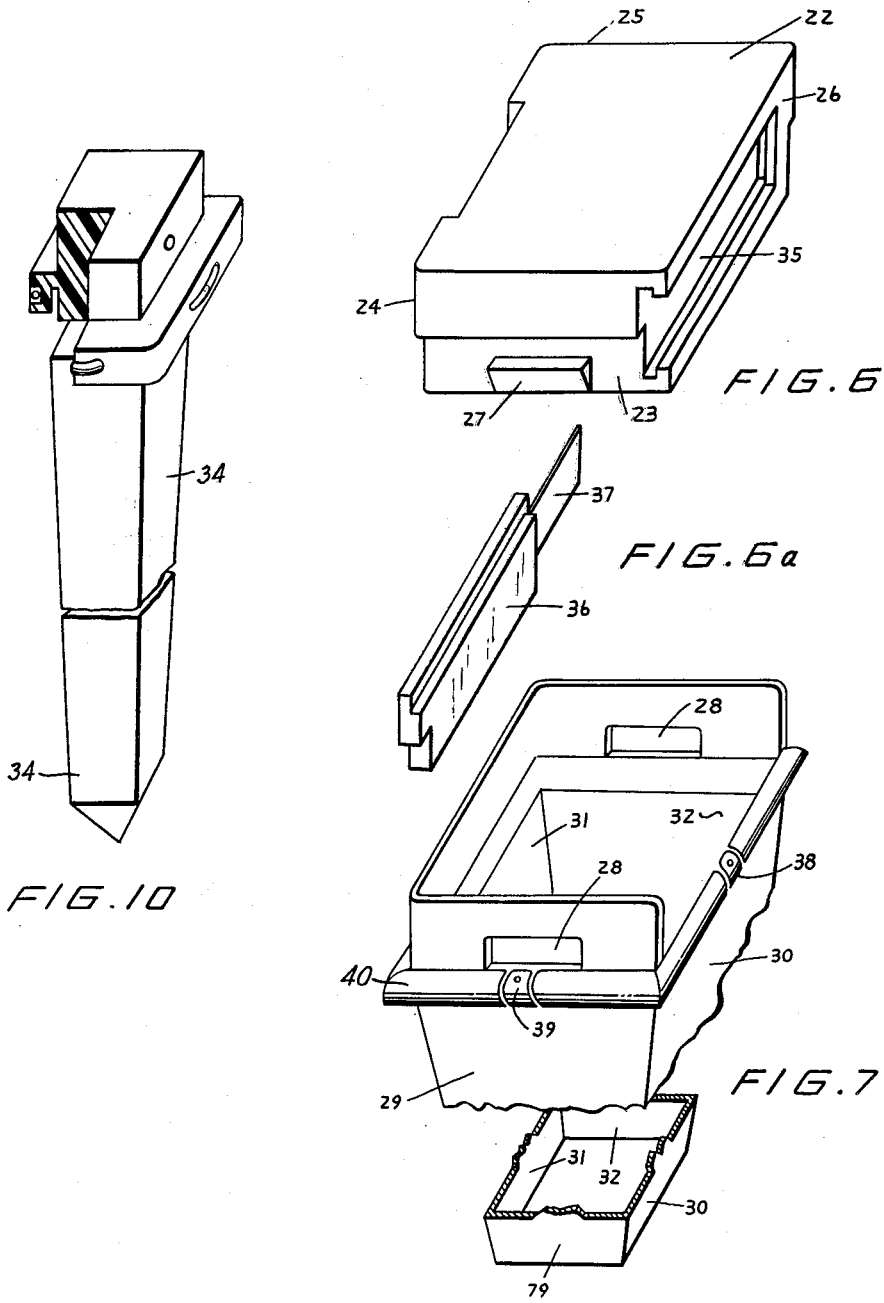
INVENTOR.
BENJAMIN S. SHEINWALD
BY
Ezekiel Wolf, Wolf + Greenfield

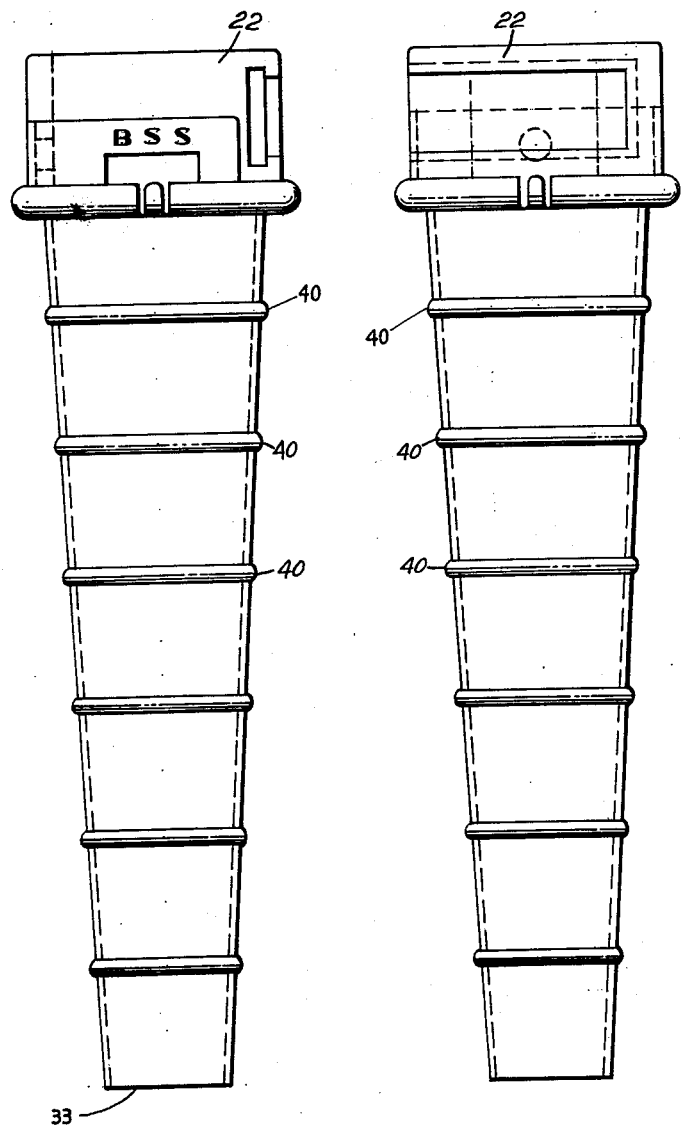

March 31, 1964 B. S. SHEINWALD 3,126,861
SURVEYING STAKE AND RELATED STRUCTURE
Filed March 24, 1961 6 Sheets-Sheet 6

INVENTOR.
BENJAMIN S. SHEINWALD
BY
Ezekiel Wolf, Wolf + Greenfield

United States Patent Office 3,126,861
Patented Mar. 31, 1964

3,126,861
SURVEYING STAKE AND RELATED STRUCTURE
Benjamin S. Sheinwald, Brookline, Mass.
(85 South St., Boston 11, Mass.)
Filed Mar. 24, 1961, Ser. No. 98,167
6 Claims. (Cl. 116—114)

The present invention relates to novel and improved stakes and the like, particularly useful in surveying and constructional work. The surveying stakes of this invention provide a strong ground gripping action, dimensional and informational indicia and may be compactly stored and carried.

It is an object of this invention to provide a stake which may be easily transported and compactly nested with other stakes.

It is another object of this invention to provide a stake in accordance with the preceding object which may be easily and firmly driven into the ground and which provides a visual indication of the depth to which it is driven.

It is a further object of this invention to provide a stake in accordance with the preceding objects having means for displaying informational data such as location and distance.

It is a still further object of this invention to provide means for employing a surveying stake in accordance with the preceding object.

Generally, the surveying stake of this invention comprises elongated side walls forming an elongated channel portion adapted to permit a plurality of the stakes to be nested together. A first end of the stake is tapered whereby the stake may be easily driven into the ground. The elongated side walls have a plurality of transversely extending spaced ridges which are adapted to prevent axial movement of the stake when it is positioned in the ground. The second end of the stake comprises a top element extending transversely of the channel and joining the side wall means. The top element has a grooved section adapted to receive a data containing means which is positioned within the stake so as to be visible. In some cases the stake may be a two part stake and the top element forms a top cap for the stake.

Where a two-part stake is employed, the side walls may comprise four enclosing sides defining a central channel tapered along its length. In this case a driving member or mandrel may be employed in conjunction with the stake to drive the stake into the ground.

Preferably the stake of this invention is adapted to carry data recording means, flags, wires and other accessories.

Figure 11:
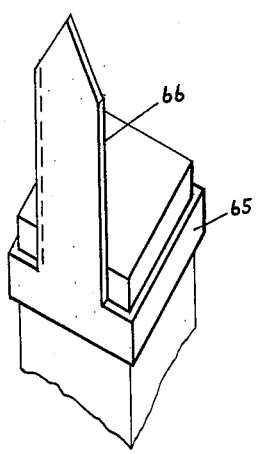
Figure 12:
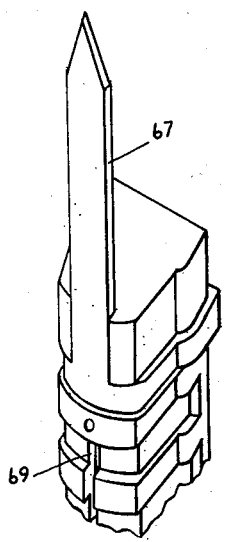
Figure 13:
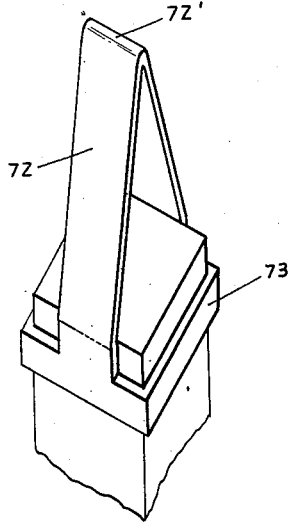
Figure 14:
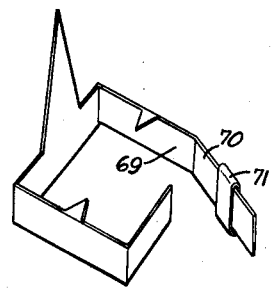

Numerous other features, objects and advantages of the present invention will become apparent from the following specification when read in connection with the accompanying drawings, in which:

FIG. 1 is a perspective view of a preferred embodiment of a surveying stake of this invention;
FIG. 1a is a perspective view of a cap element mounted on the stake of FIG. 1;
FIG. 2 is a cross sectional view taken through line 2—2 of FIG. 4;
FIG. 3 is a side view of the stake of FIG. 1;
FIG. 4 is a front view of the stake of FIG. 1;
FIG. 5 is a top view of the stake of FIG. 1;
FIG. 6 is a perspective view of a top element of a two-piece stake of this invention;
FIG. 6a is a perspective view of a data card holder;
FIG. 7 is a fragmentary perspective view of a body portion of a two-piece stake of this invention;
FIG. 8 is a front view of a two-piece stake of this invention;
FIG. 9 is a side view of the device of FIG. 8;
FIG. 10 is a perspective view showing a driving mandrel of this invention;
FIG. 11 is a perspective view of an indicator flag attached to a stake of this invention;
FIG. 12 is a perspective view of a modified indicator flag attached to a stake of this invention;
FIG. 13 is a perspective view of a further modification of an indicator flag employed with a stake of this invention; and,
FIG. 14 is a perspective view of a modified flag of this invention.

FIGURES 1, 2, 3, 4, and 5 relate to a one-piece stake used in surveying for marking and for other general constructional purposes. In one-piece stakes indicated in these figures they show two sides, 1 and 2, a top cover element 3 and a back closure element 4, thus forming four sides of a figure, the other two sides, the bottom and one end remaining open. The one-piece stake in this form is hollow and may be made preferably of metal, plastic or other hard durable material and is made in such a form as indicated in FIGURES 2 and 3 that the sides 1 and 2 are tapered at the bottom away from the open side section which is indicated as 5 in FIGURE 2. The bottom section 6 is also open, so that as the stake is driven into the ground, the earth will be received in the bottom of the stake as well as around the side. A stake made in this form may have its sides ridged as indicated by the sections 7, 8, 9 and 10, see FIGURE 1, which project outwardly and form grooves between these outwardly projecting sections which serve the purpose to prevent the stakes from moving upwards in frost or from freeing themselves generally after they had been once driven into the ground. These grooves which are indicated specifically in FIGURE 1 as 12, 13 and 14, extend all the way around the outside of the form and therefore serve to retain the stake when driven into the ground from being moved from one side to the other as well as being raised upward.

As indicated in FIGURE 1, there is also a vertically extending groove 16 to receive a flag or other indicating element useful in giving surveying data or also for high visibility. An elongated slot 17 is provided which is adapted to be aligned with similar slots in adjacent stakes when a plurality of stakes are nested. A plurality of stakes may be secured together by a carrying hook projecting through the slots 17. At the top of the stake is a further recess which is used for the insertion of a transparent card case or holder for inserting a data card. This groove is shown at 18 and is formed with a deep cross recess extending horizontally across the top to receive the data card holder and data card 19 and 20 respectively which is slid into place from side 1 of the stake. Holes 100 and 101 in the sidewalls are provided for attachment of wires used for the purposes hereinafter described.

A single piece stake shown in FIGURE 1 may also be provided with a cap element 21 indicated in FIGURE 1a, which fits over the stake and may be used to prevent the stake itself from being injured when driven into the ground after which the cap may be removed. The stake may be marked by indicia arranged at even intervals as indicated by the numbers 1, 2, 3, etc., indicating the height of the stake above the ground by the lowest number next to the ground itself. Intervals may be inches, tenths of feet, etc.

FIGURE 5 which shows a top view of the stake shows how the stake is tapered on each of its sides to permit nesting, while FIGURES 2 and 3 indicate how the stake is made somewhat pointed at its bottom so that it will be readily driven into the ground. In the multi-part stake illustrated in FIGURES 6, 6a, and 7, FIGURE 6 shows the top part of the stake, while FIGURE 7 shows the part of the stake which is driven into the ground and which surrounds the driving mandrel 34 of the stake. The driving mandrel is shown in FIGURE 10 is an exploded fashion. In FIGURE 6 the top part of the stake is indicated by the numeral 22 which is in the form of a cap with a top flat element and surrounding sides 23, 24, 25 and 26. The end sections 23 and 25 of the cap or the top portion of the stake, may have outwardly extending latch members 27 at each end which may be forced into or received by recesses 28, 28, shown in FIGURE 7 when the top cap of the stake is put in place. The stake itself as shown in FIGURE 7 is hollow and comprises four tapered side sections 29, 30, 31, and 32, which taper down to a lower smaller end which is also open and to which the driving mandrel may project. A modification of the mandrel can be such that it projects through the bottom portion of the stake. A side elevation of the stake with the top cap thereof in place is indicated in FIGURE 8 and a rear elevation of the stake is indicated in FIGURE 9. The lower end 33 of the stake is open, so that an elongated driving mandrel may project through it if desired. The driving mandrel 34 is inserted through the top of the stake and is provided with a capping element which extends over the edges of the top of the stake so that when the stake is driven into the ground, most of the pressure and impact is taken up by the driving mandrel and little by the permanent stake itself.

The top element 22 of the stake may be opened at one side, at which side the data card is received as indicated by the grooved out section 35 in FIGURE 6. Before the top 22 is inserted into the body of the stake, the data card 37 is inserted into the transparent data card holder 36 upon which the assembled elements 36 and 37 are slid into the groove provided in cap 22.

The top part of the stake may also be provided with eyelets 38 and 39 of which there may be one on each side to which a chain or other measuring device can be attached to permit a single individual to measure from the stake to some other reference point in the survey.

In putting the device into use, the driving mandrel is first inserted in the top of the stake, the stake is then driven into the ground by pounding the top of the driving mandrel and when the stake has been driven to the desired distance into the earth, the driving mandrel is removed and the top cover is inserted after the index card and other data has been inserted at the side of the top cap.

In the multipart stake where the stake is formed or molded or cast of metal or some other hard material, the side of the stake may be ribbed with outwardly projecting ribs as indicated by 40, FIGURES 8 and 9, so as to give the necessary holding qualities to the stake as it is driven into the ground.

The various flags or indicators which may be used in conjunction with the stakes of this invention are shown in FIGS. 11-14. In FIG. 11 a flag portion 66 is held to the stake by a collar 65. In FIG. 12 a flag portion 67 extends upwardly from the stake and is recessed in corresponding notches or grooves provided in the stake of FIG. 1. In FIG. 13 an inverted V shaped flag having walls 72 and 72' is affixed to a stake by a collar 73. FIG. 14 shows a flag element 69 having an encircling member 71 of a flexible material designed to act as a collar and be fastened to a stake by a locking slide means 70.

Having now described my invention, I claim:

1. A surveying stake having elongated side wall means forming an elongated channel portion adapted to permit a plurality of said stakes to be nested together, a first end of said stake being tapered whereby said stake may be easily driven into the ground, said elongated sidewall means comprising a plurality of transversely extending spaced ridges adapted to prevent axial movement of the stake when it is positioned in the ground, a second end of said stake comprising a top element extending transversely of said channel and joining said side sidewall means, said top element comprising a grooved section adapted to receive a data containing means in a visible portion thereof.

2. A stake adapted for surveying and constructional uses having elongated sidewall means forming an elongated channel portion adapted to permit a plurality of said stakes to be nested together, a first end of said stake being tapered whereby said stake may be easily driven into the ground, said elongated sidewall means comprising a plurality of transversely extending spaced ridges adapted to prevent axial movement of the stake when it is positioned in the ground, said transverse ridges being spaced at uniform distances from one another thereby providing a uniform scale measuring means, a second end of said stake comprising a top element extending transversely of said channel and integrally attached to said sidewall means, said top element comprising a grooved section adapted to receive a data containing means at a visible position therein.

3. A surveying stake in accordance with claim 1, wherein said elongated sidewall means comprises an elongated slot adapted to be aligned with similar slots in adjacent nested stakes.

4. A surveying stake in accordance with claim 1 wherein a groove is provided extending axially of said stake and connecting with a spaced portion between two of said spaced ridges, said groove and said spaced portion forming a mounting area for mounting a flag on said stake.

5. A surveying stake in accordance with claim 1 and further comprising a flag having a portion extending beyond said second end of said stake, and, a base portion of said flag encircling said stake sidewall means and mounted between two of said plurality of ridges.

6. The surveying stake of claim 1, wherein said top element comprises a means for engaging said stake with a stake driving cap element.

References Cited in the file of this patent

UNITED STATES PATENTS

| | | |
|---|---|---|
| 191,919 | Bonner | June 12, 1877 |
| 401,782 | Howlett | Apr. 23, 1889 |
| 1,037,147 | Johnson | Aug. 27, 1912 |
| 1,164,909 | Auberlin | Dec. 21, 1915 |
| 1,363,826 | Weldon | Dec. 28, 1920 |
| 1,444,834 | Hindmarsh | Feb. 13, 1923 |
| 1,745,303 | Lance | Jan. 28, 1930 |
| 1,777,798 | Jones | Oct. 7, 1930 |
| 1,851,404 | Rose | Mar. 29, 1932 |
| 1,904,738 | Johnson | Apr. 18, 1933 |
| 1,976,264 | Miner et al. | Oct. 9, 1934 |
| 2,088,394 | Wright | July 27, 1937 |
| 2,176,530 | Greulich | Oct. 17, 1939 |
| 2,251,640 | Skrainka | Aug. 5, 1941 |
| 2,262,501 | Johnson | Nov. 11, 1941 |
| 2,329,046 | Halbig | Sept. 7, 1943 |
| 2,384,338 | Rasso | Sept. 4, 1945 |
| 2,585,784 | Jones | Feb. 12, 1952 |
| 2,667,335 | Lewis | Jan. 26, 1954 |

OTHER REFERENCES

Marker Stone, marking boundary between D.C. and Maryland, Fessenden St. and Western Ave., D.C. Enclosing fence erected by D.A.R. in 1916.